(12) United States Patent
Mehta

(10) Patent No.: US 9,015,649 B2
(45) Date of Patent: Apr. 21, 2015

(54) METHOD AND APPARATUS FOR ELECTRONIC SYSTEM MODEL GENERATION

(75) Inventor: Ashok Mehta, Los Gatos, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 791 days.

(21) Appl. No.: 12/838,577

(22) Filed: Jul. 19, 2010

(65) Prior Publication Data

US 2012/0017197 A1 Jan. 19, 2012

(51) Int. Cl.
*G06F 9/44* (2006.01)
*G06F 9/45* (2006.01)
*G06F 17/50* (2006.01)

(52) U.S. Cl.
CPC ........ *G06F 17/5022* (2013.01); *G06F 2217/86* (2013.01)

(58) Field of Classification Search
CPC ............. G06F 8/10; G06F 8/30; G06F 8/443; G06F 8/52; G06F 17/5022
See application file for complete search history.

(56) References Cited

U.S. PATENT DOCUMENTS

| | | | |
|---|---|---|---|
| 7,607,116 B2 * | 10/2009 | Kwon | 716/106 |
| 7,904,850 B2 * | 3/2011 | Spackman et al. | 717/136 |
| 8,234,624 B2 * | 7/2012 | Devins et al. | 717/106 |
| 8,336,009 B2 * | 12/2012 | Mehta | 716/106 |
| 8,413,106 B1 * | 4/2013 | Goossens | 717/104 |
| 2006/0282233 A1 * | 12/2006 | Pasricha et al. | 703/1 |
| 2008/0184193 A1 * | 7/2008 | Devins et al. | 717/104 |
| 2009/0319983 A1 * | 12/2009 | Tatsuoka et al. | 717/104 |
| 2010/0070955 A1 * | 3/2010 | Kahlon | 717/141 |
| 2011/0197174 A1 * | 8/2011 | Wu et al. | 717/104 |
| 2011/0307847 A1 * | 12/2011 | Liao et al. | 716/103 |
| 2012/0017197 A1 * | 1/2012 | Mehta | 717/104 |

OTHER PUBLICATIONS

Hibibi et al., Design for Verification of SystemC Transaction Level Models, Mar. 2005, 6 pages.*
Hwang et al., Accurate timed RTOS model for transaction level modeling, Mar. 2010, 4 pages.*
Cho et al., Interface synthesis for heterogeneous multi-core systems from transaction level models, Jul. 2007, 3 pages.*
Official Action issued Nov. 16, 2012 in counterpart Chinese Patent Application No. 201110093488.3.
Shi, X., "Transaction Level Modeling in SoC Design", 1994-2012 China Academic Journal Electronic Publishing House, 3 pages.

(Continued)

*Primary Examiner* — Thuy Dao
(74) *Attorney, Agent, or Firm* — Duane Morris LLP

(57) ABSTRACT

A method of transmitting data is disclosed. At least one system block of a system-on-chip (SoC) is modeled at an untimed functional level in first and second untimed functional models. First and second transaction level (TL) models of the at least one system block system block are modeled at a transaction level (TL) using the first and second untimed functional models, respectively. First and second cycle accurate (CA) models are modeled at a cycle accurate (CA) level using the first and second TL models, respectively. Data is transmitted from the first untimed functional model to the first CA model, from the first CA model to the second CA model via a CA bus, and from the second CA model to the second untimed functional model.

16 Claims, 8 Drawing Sheets

(56) References Cited

OTHER PUBLICATIONS

Kim, Y.T et al., "Fast and Accurate Transaction Level Modeling of an Extended AMBA2.0 Bus Architecture", IEEE Computer Society, Proceedings of the Design, Automation and Test in Europe Conference and Exhibition, 2005, pp. 1-2.

"Integrating TLM with RTL!", Dashboard, Apr. 2005, pp. 1-5.

Bennett, J., "Buidling a Loosely Timed SoC Model with OSCI TLM 2.0—A Case Study Using an Open Source ISS and Linux 2.6 Kernel", Embecosm, 2008, Application Note 1, Issue 1, pp. 1-62.

Boukhechem, S. et al., "SystemC Transaction-Level Modeling of an MPSoC Platform Based on an Open Source ISS by Using Interprocess Communication", International Journal of Reconfigurable Computing, 2008, pp. 1-10.

Romdhane, N., "AMBA Programmer's View Extensions to OSCI TLM v2.0", RealView Tools by ARM, DSTG, Apr. 2007, pp. 1-18.

OSCI TLM-2.0 Language Reference Manual, Software Version: TLM 2.0.1, Document Version JA32, 2007-2009; http://www.systemc.org/downloads/standards/.

Official Action issued Jun. 24, 2013 in counterpart Chinese Patent Application No. 201110093488.3.

Bennett, J., "Building a Loosely Timed SoC Model with OSCI TLM 2.0", A Case Study Using an Open Source ISS and Linux 2.6 Kernel, Embecosm, Application Note 1, Issue 2, Publication Date May 2010, 4 pages.

Boukhechem S. et al., Research Article "SystemC Transaction-Level Modeling of an MPSoC Platform Based on an Open Source ISS by Using Interprocess Communication", Hindawi Publishing Corporation, International Journal of Reconfigurable Computing, vol. 2008, Article ID 902653, 2008, 10 pages.

\* cited by examiner

METHOD AND APPARATUS FOR ELECTRONIC SYSTEM MODEL GENERATION

BACKGROUND

Integrated circuit (IC) technology is continuously increasing in complexity due to improvements in semiconductor process fabrication techniques. Complete system-on-chip (SoC) solutions, involving many elements such as a processor, timer, interrupt controller, bus, memory, and/or embedded software on a single circuit, are now available for a variety of applications. Software development, early hardware architecture exploration and functional verification of a complex SoC or processor device are challenges faced by the semiconductor industry. At process fabrication technologies of 65 nm and smaller, with millions of transistors available to implement large and complex SoCs, the challenge of functionally verifying such complex devices grows exponentially. Industry data suggests that upwards of 80% of all project resources are allocated to software development and functional verification of these devices.

A typical design process begins with a software program that describes the behavior or functionality of a circuit to be created. Such a software program is typically written in procedural programming languages such as C/C++ that define behavior to be performed with limited implementation details. Register transfer level (RTL) is a level at which a digital system is described in terms of synchronous transfer between functional units. RTL is one level higher than a gate level. At RTL, every operation's order of execution (and thus timing) is completely specified. An RTL model of an IC device may be used as an input to an automated digital synthesis tool to create a gate level netlist. As used herein, the term "model" is used to describe a unit, which may be realized in software and embodied on a computer readable storage medium, that represents the behavior of a desired device (e.g., a system block) in a form other than the actual device. Logic synthesis tools convert an RTL description to a gate level netlist. A gate level netlist further goes through transistor level transformations by so-called place and route tools to reach the physical IC level.

BRIEF DESCRIPTION OF THE DRAWINGS

The following will be apparent from elements of the figures, which are provided for illustrative purposes and are not necessarily to scale.

DETAILED DESCRIPTION

Figure 1:
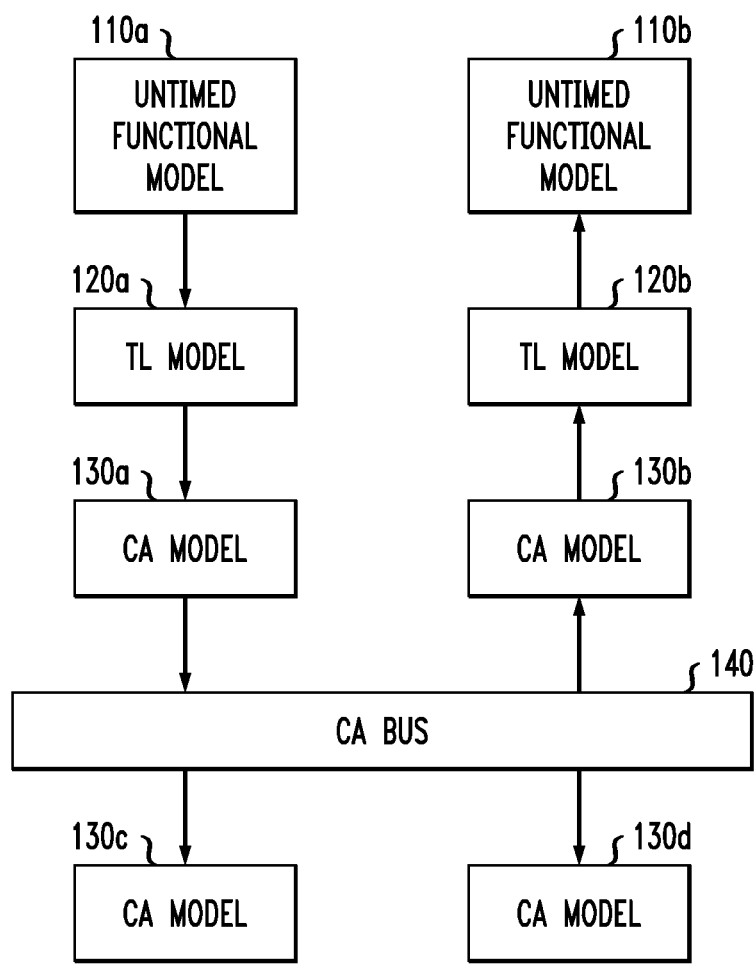
FIG. 1 is a block diagram in accordance with an embodiment.

Because of the slow simulation speed of RTL designs, software development at RTL is challenging. Simulation speeds in the range of multi-million cycles per second are conducive to software development, whereas RTL typically provides simulation speeds of less than 100-200 cycles per second. The usage of hardware accelerators and emulators has proliferated to achieve the cycles-per-second throughput conducive to software development. However, a hardware accelerator or an emulator can only be used once an RTL or gate level design is available. By the time RTL design information is ready, it is too late in the design cycle to make architectural changes for developing optimally performing and functionally accurate software. Many projects get cancelled or arrive at market too late because of delays in software development. Therefore, a platform or vehicle to develop software before committing to design at RTL or gate levels is desirable and is provided in various embodiments.

Higher level untimed functional models or models based on the Open SystemC Initiative (OSCI) SystemC TLM-2 Loosely Timed (LT) protocol afford software developers a fast simulation platform before committing to RTL for early software development. The OSCI System C TLM-2 LT protocol is described in the IEEE 1666-2005 Standard SystemC Language Reference Manual and the OSCI TLM-2.0 Language Reference Manual, both of which are hereby incorporated by reference herein in their entireties. Communication between LT models and among processes within a model occurs at a purely functional transaction level where there is no signal level functional or clock level timing granularity, which speeds up simulation by orders of magnitude relative to cycle accurate RTL simulation. As used herein, the term "cycle accurate" refers to timing granularity that specifies timing faithfully in terms of cycles. The term "transaction" refers to an electronic representation that encodes a complete interaction, e.g., writing one or more bytes from CPU to memory. A transaction may be a sequence of instructions at a higher level than the basic, atomic level at which a device operates. A transaction at RTL typically requires multiple clock cycles to execute. A TL model can quickly calculate the end result of a transaction (e.g., the end state of a device being modeled) without the need to perform each step that the real device would actually perform. A transaction at TL may take zero time or take some "approximated" time not measured in clock cycles. In contrast, RTL transactions are considered to take up clock cycles. Thus, a TL model executes more quickly than a lower level (and thus more faithful) model, such as an RTL model. Early software development enables early identification of exact architectural and functional requirements that the software needs, which ensures that the eventual silicon will indeed meet software requirements.

Similar to software development is the problem of hardware architecture exploration. Conducting hardware architecture explorations at RTL typically occurs too late in the design cycle, because RTL designs are not available at an early stage. Identification of a latency or performance issue at RTL necessitating a change in the architecture of the chip is too late in the design cycle. Changes to RTL are tedious, labor intensive and highly error prone.

Higher level OSCI-SystemC TLM-2 Approximately Timed (AT) protocol models are well suited for hardware architecture exploration. As used herein, the terms "high," "higher," "low, and "lower" refer to functional and timing granularity. For example, a higher level corresponds to coarser functional and timing granularity than a lower level. Coarser functional granularity refers to modeling a device at an algorithmic level that does not deal with the signal level functional granularity of RTL. Coarser timing granularity refers to modeling a device with no timing granularity (as in an untimed model) or with approximated timing granularity. Approximated timing granularity refers to loosely timed (LT) or approximately timed (AT) granularity. LT and AT timing are approximations associated with transaction level (TL) modeling and are discussed further below. RTL is cycle accurate timed and is considered to be a relatively low level. The AT protocol provides sufficient timing granularity to better approximate the latencies that a system may face when finally designed at the cycle accurate RTL level. AT has finer timing granularity because of its four (or more) phased communication protocol compared to the two phased protocol of LT. But the AT timing granularity is also higher than the cycle accurate RTL granularity. In other words, AT is fast enough with enough real timing information to allow quick and meaningful hardware architectural exploration before committing to RTL.

As used herein, the terms "electronic system level (ESL)" and "untimed functional level" refer to a high level using an untimed procedural programming language such as C or C++, and an untimed functional model is a model that is modeled at that high level. An untimed functional model may be a starting point in the design of a system and may be used to explore and validate algorithms that define the core functionality of a device. Once such a model is built and validated, a system for software development and hardware architecture exploration may be built from the untimed functional using LT or AT wrapper logic modules ("wrappers") as detailed below. Thus, the investment (in terms of time and resources) put into building the algorithm untimed functional model is reused in embodiments to speed up development of the LT or AT system. The LT platform allows software development to proceed in parallel with the AT platform that allows architectural explorations.

The Loosely Timed (LT) communication protocol provides the fastest simulation throughput (speed) because of its simple two-phased request/response protocol. Because of high simulation speed, LT is well suited for software development early in the design cycle. Software development uses core functionality, address maps and system registers but does not need any timing granularity except for synchronization among memory writes/reads and register writes/reads, which model developers may implement using known methods, e.g., using SystemC semaphores, as is understood by one of ordinary skill in the art.

The Approximately Timed (AT) communication protocol, on the other hand, is four-phased (start request, end request, start response, end response) and supports non-blocking behavior, providing further refinement of timing granularity. Such timing granularity enables system performance evaluation, early power estimation and architecture explorations. Such timing granularity allows better approximation of latencies that exist in a system than LT, thereby allowing good estimation of performance and different possible architectures.

The LT and AT protocols are components of a higher modeling level (relative to RTL) known as Transaction Level Modeling (TLM) or "transaction level" (TL) as used herein.

At a higher level, design exploration can be performed to evaluate achievable performance and power consumption, which parts to use, etc. TL refers to a high level for modeling digital systems where communication between modules is separated from the details of the implementation of functional units.

Another challenge facing system designers is the functional verification of a device. Industry data suggests that nearly 60% of first silicon fails because of functional failures. The current techniques for functional verification of complex electronic systems at RTL are inadequate because of the increased time to develop verification environments, increased time to simulate because of slow RTL simulation speeds, and increased time to debug because of fine design granularity.

Various embodiments advantageously provide a platform that is modeled at a higher level, where most of the functional verification can be conducted, and then reuse the higher level model during RTL verification to speed up simulation. For example, embodiments utilize an untimed functional model, which may be implemented in a language such as C or C++, and generate TL and cycle accurate (CA) models therefrom. Some embodiments transform an untimed functional model (e.g., one that is used for algorithm development) to a TL (LT or AT) model and then further to a cycle accurate model of the final design, continually reusing the higher level model to drive lower levels. In some embodiments, the final RTL design is not readied all at once, as a higher level model may be used in conjunction with a cycle accurate transactor in place of the final RTL for system blocks that are still under development. Advantageously, a first pass working silicon may thus be delivered to market sooner than previously possible.

FIG. 1 is a block diagram in accordance with an embodiment. The left and right sides of FIG. 1 may correspond to an initiator and a target, respectively, and are labeled with similar reference characters having different suffixes ('a' and 'b', respectively); this convention is adopted for other figures as well. A TL model 120a is generated from an untimed functional model 110a. A cycle accurate (CA) model 130a is generated from the TL model 120a. Details of such generation are presented further below in the contexts of other figures. The CA model 130a so generated communicates with other models via a CA bus 140. For example, CA model 130a may communicate with a CA model 130b that is itself generated from another untimed functional model 110b via a TL model 120b, or CA model 130a may communicate with other CA models 130c, 130d. Formerly, techniques did not exist to enable untimed functional models such as models 110a, 110b to communicate using CA bus 140 for hardware functional verification, as separate CA models (not generated from the untimed functional models) were needed. By enabling lower level models to be generated from higher level models, an embodiment as depicted in FIG. 1 enables reuse of untimed functional models at lower levels, freeing up valuable developer time and resources.

Figure 2:
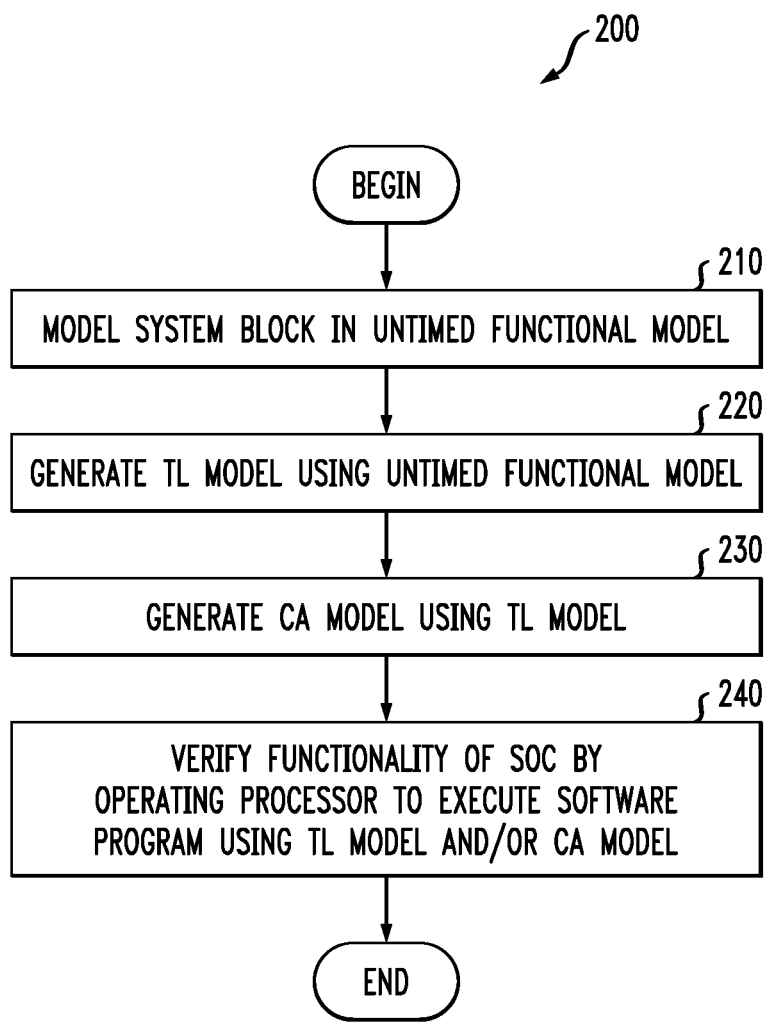
FIG. 2 is a flow diagram in accordance with an embodiment.

FIG. 2 is a flow diagram in accordance with an embodiment. After process 200 begins, at step 210, a system block of a system-on-chip (SoC) is modeled in an untimed functional model at a first level, e.g., an untimed functional level. At step 220, a TL model is generated using the untimed functional model at a lower transaction level (TL). At step 230, a cycle accurate (CA) model is generated (230) using the TL model at a lower CA level. At step 240, functionality of the SoC is verified by operating a processor to execute a software program using at least one of the TL model and the CA model, i.e., one or the other or both. Generation of the TL model and of the CA model is first discussed briefly below, and details are presented further below in the context of other figures.

Initially, an untimed functional model of a device is created using a programming language such as C or C++. A loosely timed (LT) or approximately timed (AT) wrapper logic module creates a TL model (an LT or AT model) around the untimed functional model. The TL model may act as an initiator or target. In order to initiate a transaction on a TL bus (an LT or AT bus), the initiator TL wrapper logic calls the higher level untimed functional model to retrieve data therefrom and encapsulates the information into a SystemC TLM-2 compliant generic payload (GP). The wrapper logic creates a transaction object using the GP and uses SystemC TLM-2 standard methods to communicate the GP to other models that also communicate using the LT or AT protocols. The target TL model sends the payload it receives from initiator TL model to its functional core ESL model. When a target model wants to return data, its TL wrapper logic retrieves response data from a target core ESL model and updates the GP at the reference pointer provided by the initiator. The target side then returns a status indicator back to the initiator side using LT or AT.

In order to initiate a cycle on a CA bus, the TL wrapper logic sends a transaction to a cycle accurate transactor (described further below), which in turn decodes the transaction, retrieves its payload, and drives it onto the CA bus according to a specific CA bus protocol. When a target wants to return data, the TL wrapper receives response data described above (data from an untimed functional model) and sends a response transaction to the cycle accurate transactor. The transactor decodes the transaction and retrieves its payload to drive the CA bus with data.

In order to start with an untimed functional model and reach the next (lower) level of timing granularity (either LT or AT, both of which are TL), various embodiments build a system out of components that communicate with each other using OSCI TLM-2 standard protocols LT or AT. In order to build a system using LT or AT protocols, an untimed ESL functional core model is "wrapped" with an LT or AT wrapper as detailed below.

Generation of TL Model from Untimed Functional Model

Wrapping Untimed Functional Model with LT Wrapper

Figure 3:
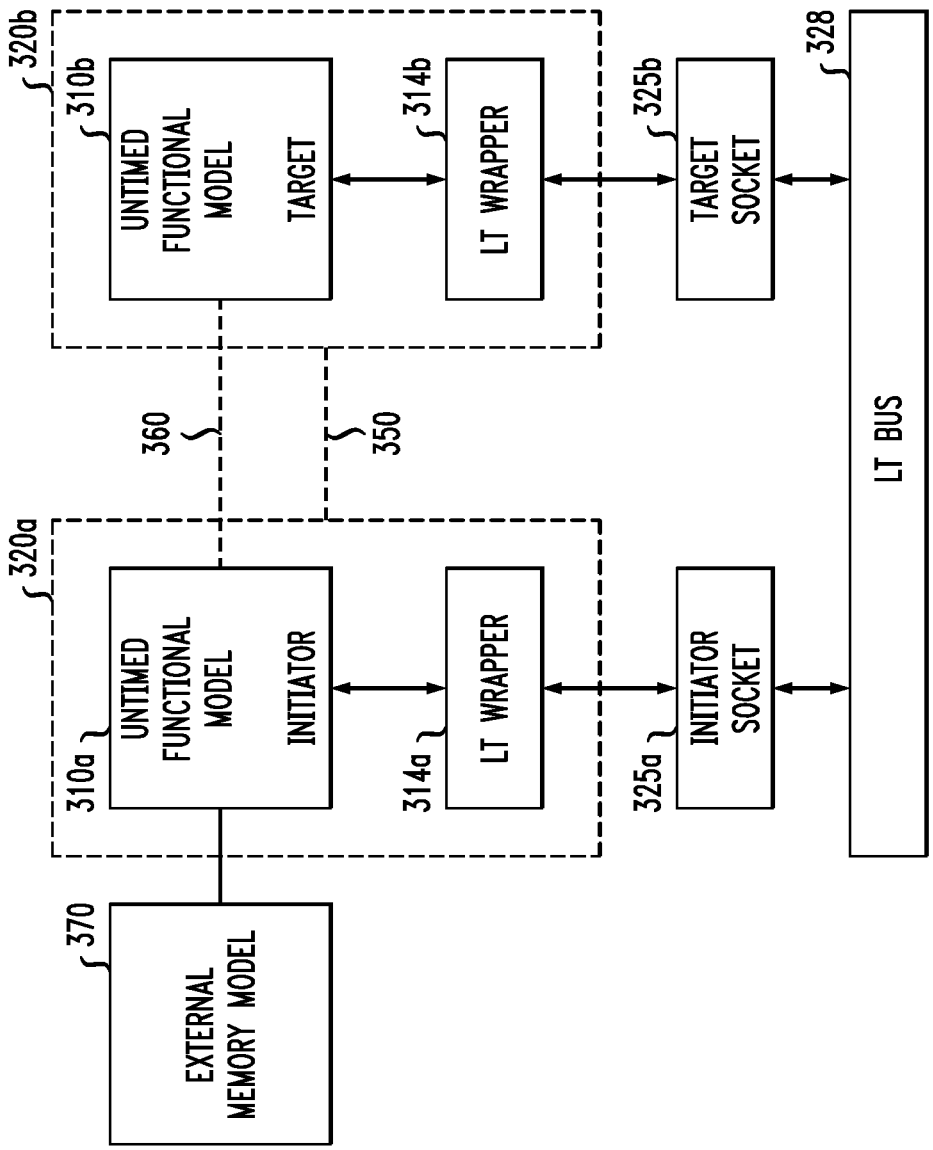
FIG. 3 is a block diagram showing generation of a transaction level (TL) model from an untimed functional model using a loosely timed (LT) wrapper in accordance with an embodiment.

FIG. 3 is a block diagram showing generation of a TL model from an untimed functional model using an LT wrapper. The term "wrapper" as used herein refers to a logic module that enables generation of a lower level model from a higher level module. The left and right sides of FIG. 3 correspond to an initiator and a target, respectively, and are labeled with similar reference characters having different suffixes ('a' for initiator and 'b' for target). LT wrapper 314a wraps untimed functional model 310 as detailed below, forming a TL model 320a (specifically, LT model 320a) that communicates with other TL models, e.g., with TL model 320b, via an LT bus 328 and initiator and target sockets 325a, 325b. A virtual communication link 350 between TL models 320a and 320b is shown in FIG. 3. In some embodiments, the initiator socket 325a and target socket 325b communicate via, e.g., a function known as b_transport( ). However, the payload (i.e., the transaction data, meaning the address, data, byte enables, etc. of a transaction) that this b_transport( ) function passes between initiator and target is not passed by using constant values. Instead, the b_transport( ) function passes a pointer (reference) to this payload between initiator and target. The reason for this is that both initiator and target can write/read data directly at the pointer (memory address) obtained through b_transport( ) without passing back and forth the constant values between them and slowing down simulation.

Hence, the virtual communication link 350 does not replace the socket-based interface. The virtual communication link is a pointer to the payload that the sockets pass around. As is understood by one of ordinary skill in the art, a pointer is an address in memory where a payload is located and which can be accessed by both the initiator and the target. The b_transport( ) function passes this address between initiator and target. A virtual communication link 360 at the untimed functional model level is also shown. FIG. 3 may correspond to a scenario in which an untimed functional model (model 310a) already exists or to a scenario in which an untimed functional model does not exist initially but is created along with an LT wrapper. In the first scenario, where untimed functional model 310a already exists (i.e., a system block has already been modeled at the untimed functional level), certain parts of the model that communicate with external models (e.g., with an external memory model 370) are modified in various embodiments. For example, untimed functional model 310a may have a function called WriteToMemory that writes to an external memory model 370. Thus, wrapper logic 314a is configured to modify an interface between the untimed functional model 310a and the external memory module 370.

Within the body of WriteToMemory, code may be modified as follows (only pseudo code is shown below):

```
void WriteToMemory( ); {
properties of the method;
#ifdef untimedFunction
    <original code as is>
#elif LT
    <create Generic Payload> from the properties of the method (address, data, etc.).
    <create transaction object pointer to the Generic Payload>
    <send object pointer to LT_Initiator_Socket function>
#endif
}
void LT_Initiator_Socket( );
{
    <create TLM-2 Initiator Socket>
    <send Generic Payload object pointer using TLM-2 b_transport method of the Initiator Socket>
}
```

During compilation of the untimed functional model 310a, either the "untimedFunction" or the "LT" may be used as the compiler pre-processor command line option, providing a practical approach to using the original core (i.e., untimed functional model) "as is" but also allowing a reuse of the same functional core for building LT based systems for software development.

For the second scenario, i.e., there is no pre-existing untimed functional model, the untimed functional model function may be called from (invoked by) the LT wrapper logic because the untimed functional model has not been built yet, which is the reverse of the first scenario. The second scenario may be more preferable because it is easier to call a function in an untimed domain from a function in the loosely timed domain. In other words, it is easier to synchronize from a timed domain to an untimed domain, as opposed to the other way around. The LT timed domain knows exactly when an external LT model requests data from the untimed model or needs to send data to another model. The LT model 320a then calls the untimed model 310a at that time. The untimed functional model 310a completes its function in zero time (because it is untimed) and returns to the timed domain.

Example pseudo code is presented below:

```
void LT_Initiator_Socket( );
{
    <create TLM-2 Initiator Socket>
    <call the untimed ESL Model's WriteToMemory( ) function to
request data it wants to write to the LT bus>
        <create Generic Payload> from the data received from the ESL model
        (address, data, etc.).
        <create Transaction object pointer to the Generic Payload>
        <send Generic Payload object pointer using TLM-2 b_transport
method of the Initiator Socket>
}
void WriteToMemory( );
{
properties of the method;
#ifdef untimedFunction
    <original code as is>
#elif LT
    <provide data to LT_Initator_Socket( ) as requested and return.
#endif
}
```

The Loosely Timed communication protocol in the TLM-2 standard is implemented using a blocking transport interface method, e.g., b_transport( ) Blocking in this context means that a single function implements the functionality, and the same initiator thread is blocked from making another request to the target until it receives a return status for its previous request. No backward path for response is necessary, because the initiator simply waits (is blocked) until the target returns with a response status. The target may or may not consume time before returning a status to the initiator. The target does not consume time by issuing any explicit 'wait' signal during its processing, because a 'wait' suspends the processing thread and returns control to the underlying event scheduler (of the SystemC simulation kernel, as is understood by one of ordinary skill in the art). When a model or a process returns control to the event scheduler, a significant amount of CPU time is consumed by context switching. The LT communication model is designed to execute as quickly as possible, and such a 'wait' signal would negate that basic advantage. Hence, the target preferably does not 'wait' when communicating in LT mode.

Additionally, as in the SystemC TLM-2 LT standard payload definition, a transaction object (i.e. the payload) (not shown in FIG. 3) may be passed to the target as a reference (pointer). The target can directly read or write data at the pointer without explicitly passing data back and forth to the initiator by value, which speeds up simulation even more.

LT wrapper 314a creates a TLM-2 transaction using a generic payload (GP) or a protocol-specific payload (PSP). A GP contains attributes, e.g., address, data, byte enables, etc., that are used to model a basic memory-mapped bus. If a bus cannot be modeled using the GP attributes, it is extended to accommodate attributes specific to a bus. Such an extended GP may be called a PSP. For example, for Advanced eXtensible Interface (AXI) interleaved writes and reads, an identification (ID) tag (attribute) may be used. Such an ID attribute does not exist in the GP. Hence, the GP is extended to add an ID attribute and create an AXI PSP. Procedures relating to extension of a GP are detailed in the OSCI TLM-2 language reference manual widely known in the art. For a write command, LT wrapper 314a retrieves data from the untimed functional model 310a and updates the payload at the transaction object pointer with that data. The transaction object is sent by reference to LT bus 328 using initiator socket 325a and the b_transport( ) function call, i.e., a request is issued. The transaction is received at target socket 325b, and payload fields and commands are extracted, e.g., using the b_transport( ) function. Extracting a write command, LT wrapper 314b reads data from the transaction object pointer and writes the data to untimed functional model 310b. Similarly, for a read command, LT wrapper 314b reads data from untimed functional model 310b and writes the data in the data field of the transaction object pointer, and LT wrapper 314a reads the data directly from the transaction object pointer and sends it to untimed functional model 310a.

Thus, LT wrappers 314a, 314b generate TL models 320a, 320b from untimed functional models 310a, 310b, respectively. Additional details regarding rules and guidelines for programming using the SystemC TLM-2 LT protocol are known to one of ordinary skill in the art and defined in the OSCI TLM-2.0 Language Reference Manual.

Wrapping Untimed Functional Model with AT Wrapper

An AT model is generated from an untimed functional model in much the same way that an LT model is generated. AT is a four phased non-blocking protocol, whereas LT is a two phased blocking protocol. In other words, the AT protocol allows a next transaction to be started, e.g., by the same initiator thread, without waiting to receive a response for a current (present) transaction. In that sense, AT allows pipelined issuance of transactions. Multiple in-flight transaction requests and their responses may return either in-order or out-of-order. An AT initiator can only issue the next request after it receives the End_Request phase from the target for the previous request. However, an AT initiator thread may issue the next request prior to receiving a response for the previous request.

Figure 4:
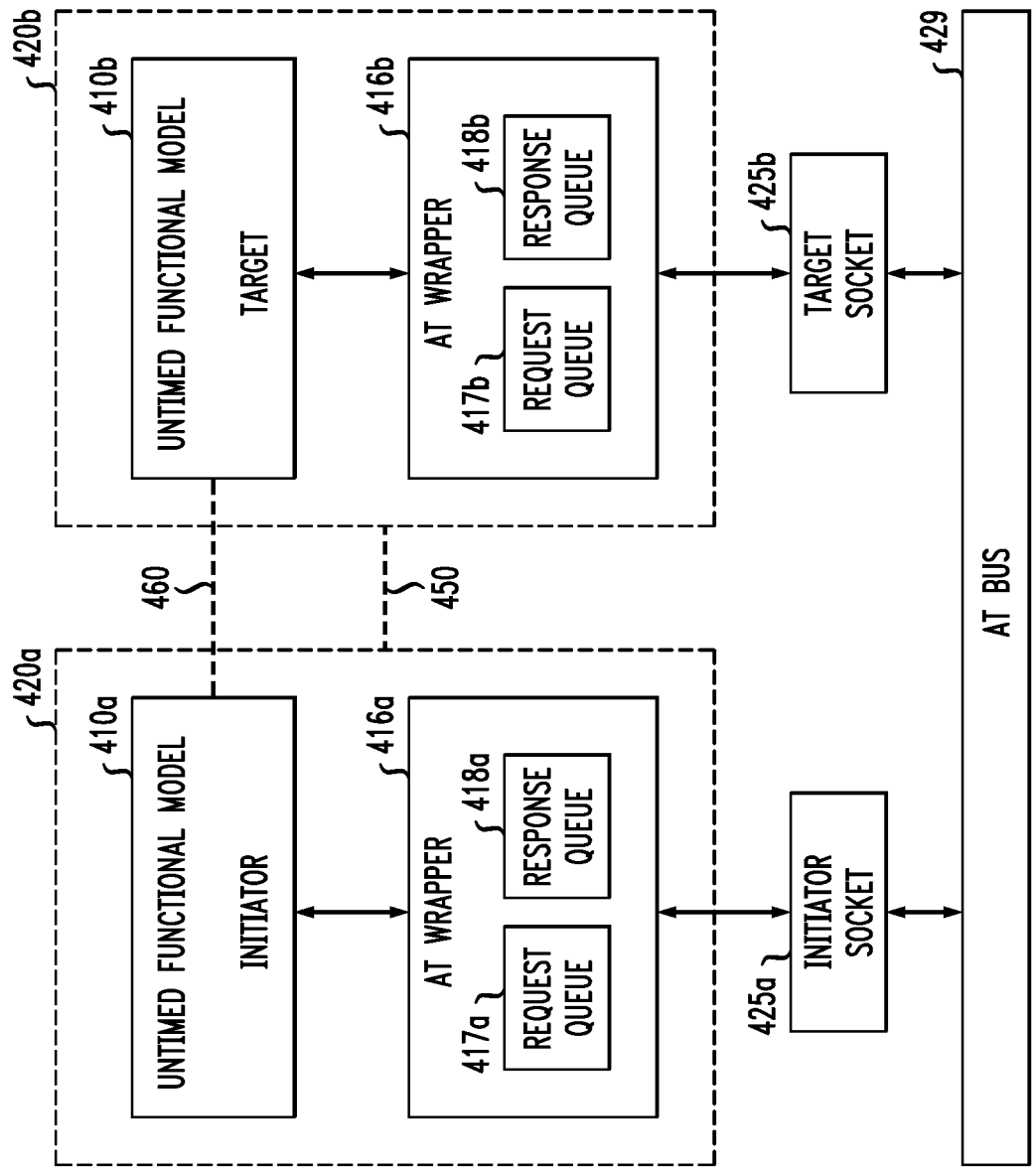
FIG. 4 is a block diagram showing generation of a TL model from an untimed functional model using an approximately timed (AT) wrapper in accordance with an embodiment.

FIG. 4 is a block diagram showing generation of a TL model 420a from an untimed functional model 410a using an AT wrapper 416a. AT wrapper 416a deploys (provides) transaction queues, namely, a request queue 417a and a response queue 418a. An LT wrapper may also deploy transaction queues, but since LT employs blocking calls, there is no real reason to line up (enqueue) transactions for issuance. AT, on the other hand, may line up transaction requests to accurately model pipelined behavior of a system. Request queue 417a lines up request transactions, whereas response queue 418a stores responses received from the AT bus 429 via initiator socket 425a.

AT wrapper logic 416a maintains queue pointers (not shown) in order to be able to determine which response belongs to which request. The OSCI TLM-2 standard defines four phases for AT communication of a single transaction: (Initiator) Start_Request, (Target) End_Request, (Target) Start_Response, and (Initiator) End_Response. In order to maintain the request and response queues 417a, 418a, various embodiments ensure that only when an End_Request is received from the target does that the initiator send the next Start_Request. The initiator cannot issue the next request until the target indicates that it has accepted the request and issues an End_Request transport call back to the initiator. However, the next request may be started before the Begin_Response of the previous request arrives. Maintenance of correct correlation between the request and response queues 417a, 418a according to the four phases of the AT protocol facilitates the modeling of pipelined cycles used by the latest high performance buses such as AXI. In other words, if an AT communication protocol models an AXI bus, logic is implemented to allow pipelined bus behavior, as with transaction queues described above.

Continuing with an AXI bus as an example, both LT and AT wrappers can extend the OSCI TLM-2 generic payload (GP) to the protocol specific payload (PSP). For example, an AXI bus requires an ID to be passed along with a Transaction to track pipelined (and out of order) writes and reads. An ID field is not part of the OSCI TLM-2 GP. Hence, the GP will have to be extended to add ID to it. Without an ID, the AT wrapper logic (and AXI logic in general) would not know which response is for which request. As mentioned above, rules for extending a GP are explained in the OSCI SystemC TLM-2.0 Language Reference Manual (LRM).

There are two ways in which AT wrapper logic 416a can communicate with untimed functional model 410a. Either internal functions of the untimed functional model 410a call the AT wrapper logic 416a, or internal functions of the AT wrapper logic 416a call the untimed functional model 410a. The first way is well suited to building an AT wrapper from an existing untimed functional model; the second way is better suited for the scenario of building both the AT wrapper logic and the untimed functional model in parallel. Either way, the AT wrapper 416a receives data from the untimed functional model 410a and creates a TLM-2 standard generic payload (GP) therefrom.

The untimed functional model 410a may issue a write or a read function that invokes the AT wrapper logic 416a. For a write, the AT wrapper logic 416a retrieves write address, data, and byte enable data from the function parameters and forms a GP, e.g., with a Write_Command according to the OSCI TLM-2 specification. The AT wrapper logic 416a may extend the GP to add fields for a specific bus protocol (i.e., PSP). For a read, the AT wrapper logic 416a places the address and byte enables in the GP, e.g., with a Read_Command.

The initiator side then creates a transaction object (not shown) as a pointer of type "generic payload" and passes it to the target side via TLM-2 initiator socket 425a, e.g., using the nb_transport_fw( ) interface function. The AT wrapper logic 416a attaches a unique ID with each transaction so that it can match the entries in the response queue 418a with those in the request queue 417a. In this manner, the initiator side can signal End_Response phases with correct IDs to the target side, and the target side can signal End_Request phases with correct IDs to the initiator side. The target side registers and implements the nb_transport_fw( ) function. Upon receipt of the transaction, the target side signals to the initiator side that it has received the request by initiating an End_Request transaction with an appropriate ID back to the initiator side, e.g., using the nb_transport_bw( ) function call.

For a write command from the initiator side, the target AT wrapper 416b issues a Begin_Response transaction with correct ID to the initiator side to indicate that the initiator should send data. The initiator responsively updates the GP at the transaction object pointer with write data and sends an End_Response transaction with correct ID to the target. The AT wrapper logic 416b retrieves the data from the GP at the transaction object pointer and passes the write data and address to core memory of the untimed functional model 410b.

For a read command from the initiator side, the target AT wrapper 416b reads data from core memory of the untimed functional model 410b and directly updates the data at the transaction object pointer. The target AT wrapper 416b initiates a Begin_Response transaction with correct ID using the nb_transport_bw( ) functional call to the initiator, which reads data from the GP at the transaction object pointer and sends the data to core memory of the untimed functional model 410a. The target side then ends the transaction with an End_Response with correct ID.

Thus, AT wrappers 416a, 416b generate TL models 420a, 420b from untimed functional models 410, 420b, respectively. Additional details regarding the AT communication protocol and the rules to follow are known to one of ordinary skill in the art and are defined in the OSCI TLM-2.0 Language Reference Manual (LRM). FIG. 4 shows virtual communication links 450 and 460 for communication at the TL and untimed functional levels, respectively.

Generation of CA Model from TL Model

In various embodiments, a cycle accurate transactor module (transactor) communicates with the TL wrapper logic module and with a CA bus to form a CA model. In brief, a transactor receives a transaction from the LT or AT wrapper and retrieves the payload information from the transaction (such as address, data, byte enables, burst, etc.) and also the command information (e.g., Write_Command, Read_Command). The transactor is designed to work with a specific cycle accurate bus protocol (e.g., the AXI protocol). Based on either a write or read command, the transactor starts the appropriate cycle on the bus. The transactor drives the required address and control information on the bus to initiate a cycle and either writes required data onto the bus or waits for required read data to arrive.

Figure 5:
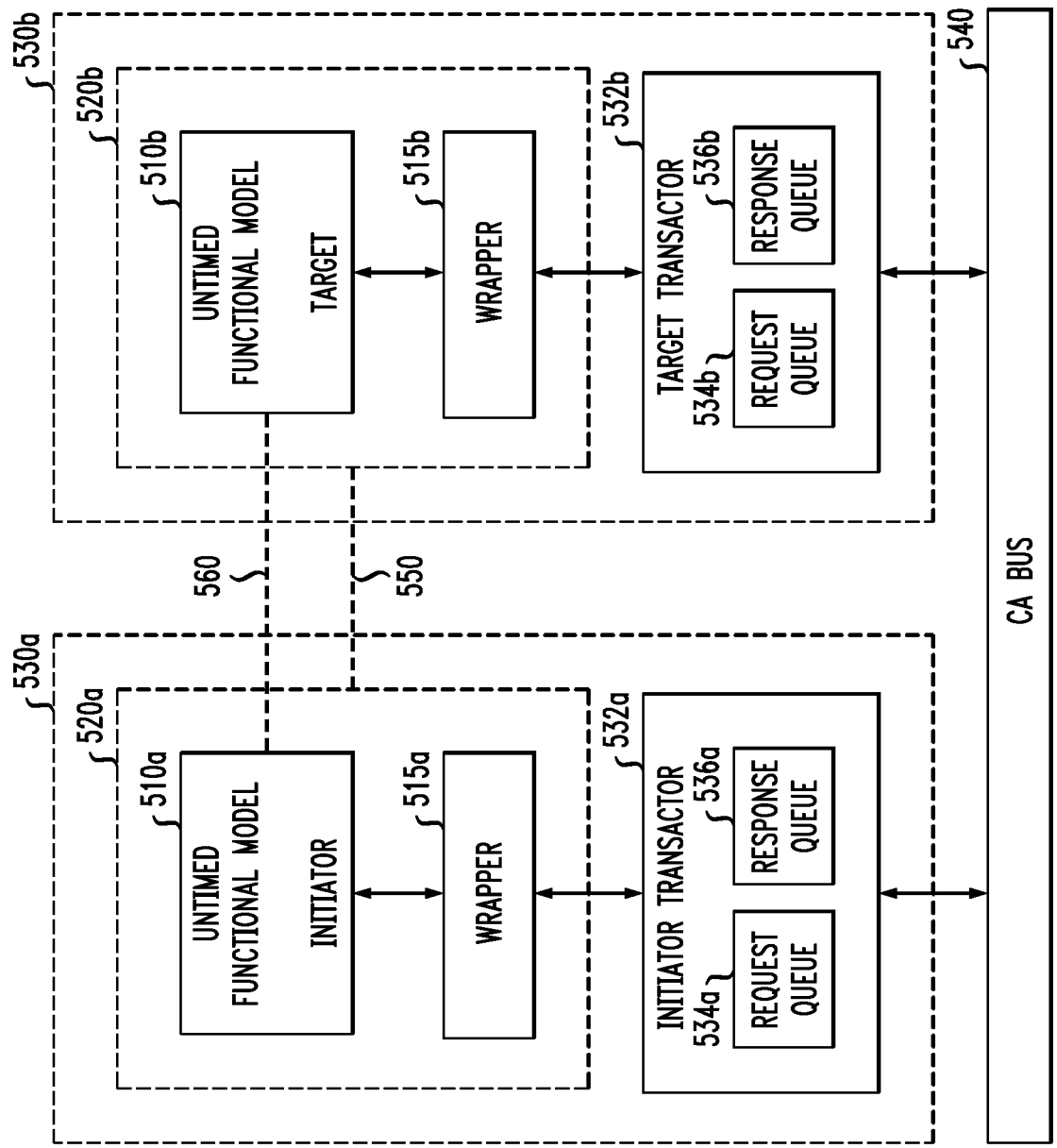
FIG. 5 is a block diagram showing generation of a cycle accurate (CA) model from a TL model using a TL wrapper in accordance with an embodiment.

FIG. 5 is a block diagram showing generation of a CA model 530a from a TL model 520a, specifically by using a TL wrapper 515a, which may be LT wrapper 314a or AT wrapper 316a. FIG. 5 is discussed below first in the context of LT and associated timing diagram FIG. 6 and then in the context of AT and associated timing diagram FIG. 7. Although particular transactions (e.g., burst read) are discussed below, it should be understood that these are only non-limiting examples. FIG. 5 shows virtual communication links 550 and 560 for communication at the TL and untimed functional levels, respectively; these virtual communication links operate similarly as virtual communication links 350, 360 in terms of being pointers to payloads that are passed around by sockets.

Generation of CA Model from LT Model

For a Write_Command from the loosely timed (LT) wrapper 515a to the initiator transactor 532a, the transaction level (TL) wrapper 515a, which is in this case an LT wrapper, creates a payload with write information that it receives from untimed functional model 510a. The LT wrapper 515a sends this transaction to a request queue 534a of the initiator transactor 532a. The initiator transactor 532a retrieves and decodes the transaction from the queue 534a and drives address, data, and control signals on the CA bus 540 to initiate a write cycle.

On detection of the start of a write cycle, the target transactor 532b of CA model 530b retrieves an address and data according to byte enables and passes such information to transactor logic (not shown in FIG. 5) that forms a transaction with write data payload. The target transactor 532b puts the transaction in a request queue 534b. For a burst write, the target transactor 532b continues to monitor the data bus until it receives the last data before forming the transaction. The LT wrapper 515b accepts the transaction and sends write data to the untimed functional model 510b. The LT wrapper 515b then sends a success or fail status indicator to the target transactor 532b. Responses are stored in responses queues 536b, 536a of the target and initiator, respectively for the return direction of communication.

For a Read_Command from the LT wrapper 515a to the initiator transactor 532a, the LT wrapper 515a creates a payload with read address, byte enables, burst length, etc., and puts the payload in initiator request queue 534a. The initiator transactor retrieves and decodes the transaction from the request queue 534a and drives address and control signals on the CA bus 540 to initiate a read cycle, leaving the data bus in an undriven float state. For the AXI burst read example shown in FIG. 6, the initiator transactor 532a drives an address on the ARADDR bus, asserting (high) the address valid signal ARVALID and asserting (low) the address ready signal ARREADY.

On detection of the start of a read cycle, the target transactor 532b retrieves address, byte enable and burst information and creates a transaction. The target transactor 532b puts the transaction in its request queue 534b, which is monitored by the LT wrapper 515b. The LT wrapper 515b retrieves the transaction from request queue 534b and requests data from the target's untimed functional model 510b. The LT wrapper 515b then creates a transaction payload with data from the untimed functional model 510b and puts the transaction into the response queue 536b. The target transactor 532b retrieves the transaction from the response queue 536b and drives the bus with read data for the required burst length and completes the cycle after the last read data.

The initiator transactor 532a continually monitors the data bus for read data to arrive whenever a read cycle is started. For the AXI burst read example of FIG. 6, the initiator transactor 532a detects the end of the AXI burst read cycle upon deassertion (logic high) of signals RLAST, RVALID, and RREADY. The initiator transactor 532a retrieves all the read data in its internal buffers (not shown in FIG. 5) and forms a transaction after the last read data is received. The initiator transactor 532a sends the completed transaction to the response queue 536a. The LT wrapper 515a decodes the transaction from the response queue 536a as a read command, retrieves data from the transaction payload, and sends the data to the untimed functional model 510a.

Figure 6:
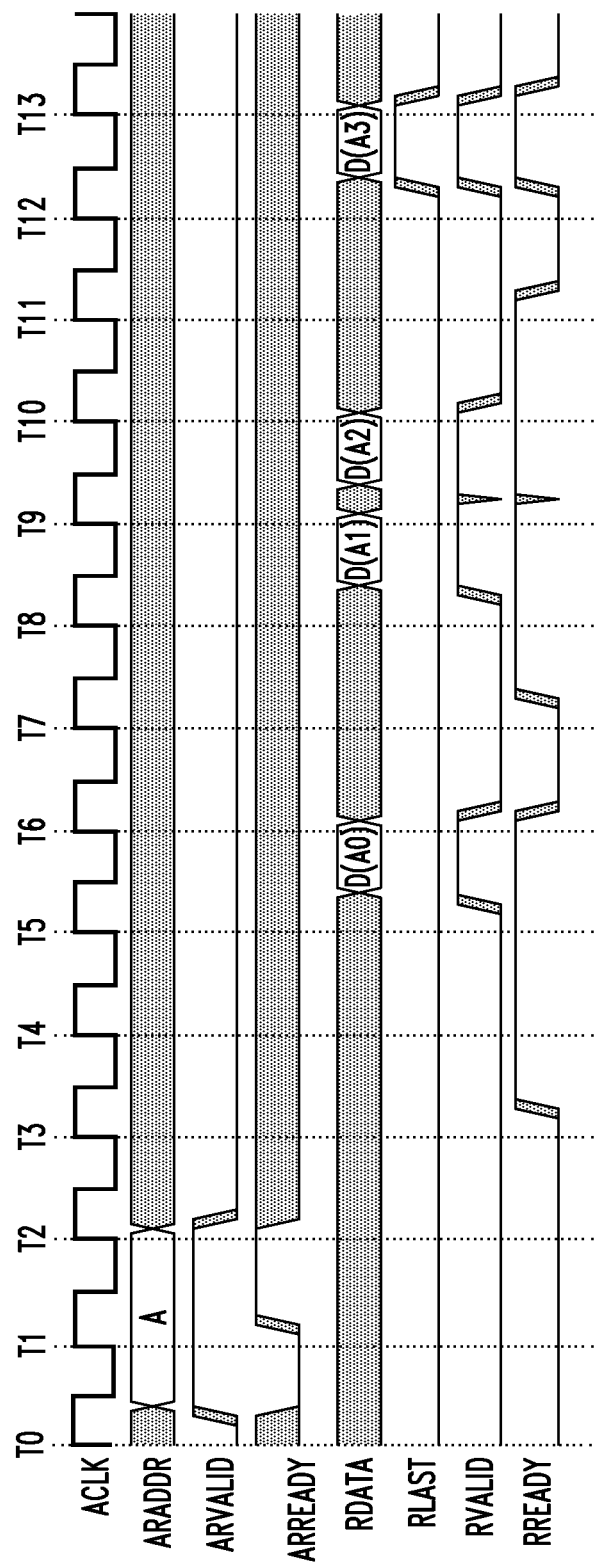
FIG. 6 is a timing diagram for a burst read cycle using the loosely timed (LT) protocol in accordance with an embodiment.

In FIG. 6, time T1 corresponds to the beginning of an LT transaction. Between times T2 and T12, the burst data is driven on the RDATA bus according to the AXI bus protocol. Time T13 corresponds to the end of the LT transaction.

Generation of CA Model from AT Model

Figure 7:
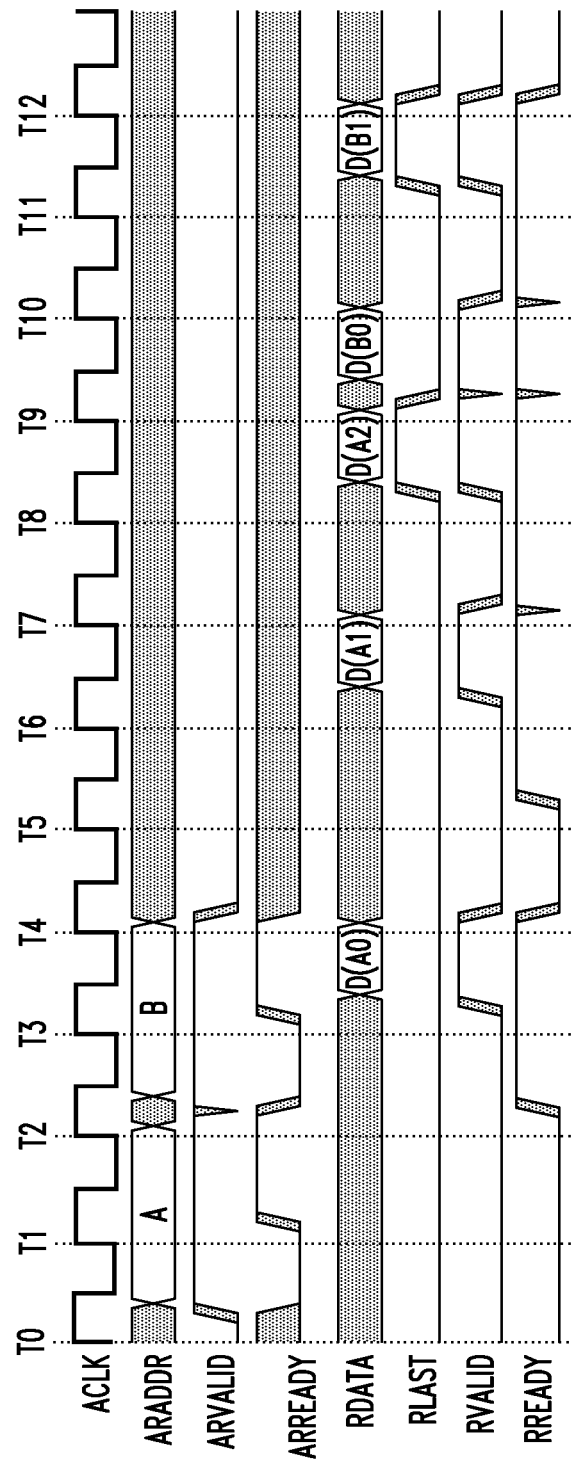
FIG. 7 is a timing diagram for a burst read cycle using the approximately timed (AT) protocol in accordance with an embodiment.

FIG. 7 is a timing diagram showing two pipelined in-order transactions using the AT protocol. For a first read command from TL wrapper 515a, which is in this case an AT wrapper, the AT wrapper 515a creates a payload with read address, byte enables, burst length, etc. and puts the payload in initiator request queue 534a with an ID. The initiator transactor 532a retrieves and decodes the transaction from request queue 534a and initiates a burst cycle using information contained in the transaction's AXI bus PSP. The initiator transactor 532a drives address on the ARADDR bus, asserting (high) the address valid signal ARVALID and asserting (low) the address ready signal ARREADY. The initiator transactor 532a signals to the AT wrapper 515a the End_Request phase once it has completed initiating the read cycle on the CA bus 540. The initiator transactor 532a continues to monitor the CA bus 540 for the Begin_Response phase of the current read cycle that it started.

Meanwhile, the initiator transactor detects a second pending transaction (with an ID) in its request queue 534a. Because AXI allows pipelined reads, the initiator transactor 532a initiates the second AXI burst read cycle by driving the relevant bus protocol signals as described above. The initiator transactor 532a signals to the AT wrapper 515a the End_Request phase once it has completed initiating the second read cycle on the bus 540. The initiator transactor 532a continues to monitor the bus for the Begin_Response phase of the second read cycle that it started.

On detection of the start of a read cycle, the target transactor 532b retrieves address, byte enable, and burst information and creates a transaction with an ID, which is stored in request queue 534b. The AT wrapper 515b decodes the incoming transaction and sends the address and byte enable information to the untimed functional model 510b to request required data. The untimed functional model 510b returns the data to AT wrapper 515b, which forms a return transaction and sends it to the response queue 536 with an ID that matches the first read request.

While waiting to receive a response for the first read command sent to the target AT wrapper 515b, the target transactor 532b detects the start of a second read cycle. The target transactor 532b retrieves address, byte enable, and burst information, creates a transaction with an ID and stores the transaction in request queue 534b.

The target transactor 532b detects that the response to the first read request is available in its response queue 536b. The target transactor 532b matches the ID of this transaction with the ID of the first read request in its request queue 534b. If the IDs match, the target transactor 532b starts driving the CA bus 540 with data received from response queue 536b and completes the cycle once the last data has been driven.

The initiator transactor 532a detects the Begin_Response phase of the first request by detecting assertion of RVALID and RREADY signals. The initiator transactor also forms a Begin_Response transaction and sends it to the AT wrapper 515a via its internal response queue 536a with an ID that corresponds to the first transaction's request ID. The initiator transactor 532a continues to monitor the bus 540 for read data until the end of the cycle, which the initiator transactor 532a notices upon detection of logic high on RLAST, RVALID, and RREADY. The initiator transactor 532a sends the completed transaction to the AT response queue with an End_Response phase with an ID that matches the first read request. The AT wrapper 515a decodes the read command, retrieves data from the transaction payload, matches the ID, and sends the retrieved data to the untimed functional model 510a.

The AT wrapper 515b on the target side decodes the second read transaction with an ID and sends the address and byte enable information to the untimed functional model 510b, which returns the data to the AT wrapper 515b. The AT wrapper 515b forms a return transaction from the returned data and sends the transaction to response queue 536b with an ID that matches the second read. The target transactor 532b detects that the response to the second read request is available in its response queue 536b. The target transactor 532b matches the ID of this transaction with the ID of the second read request in its request queue 534b. Upon a match, the target transactor 532b starts driving the CA bus 540 with data received from response queue 536b and completes the cycle once the last data has been driven.

The initiator transactor 532a detects the second Begin_Response phase once it detects assertion of RVALID and RREADY signals. The initiator transactor 532a matches the ID of this transaction with the pending request transaction in the request queue 534a and forms a Begin_Response transaction to send to the AT wrapper 515a via internal response queue 536a with an ID corresponding to the transaction's request ID. The initiator transactor 532a continually monitors the data bus 540 for read data until the end of the cycle, which the initiator transactor 532a notices when it detects logic high on RLAST, RVALID and RREADY. The initiator transactor sends the completed transaction to the response queue 536a with an End_Response phase with an ID that matches the second read request. The AT wrapper 515a decodes the read command, grabs data from the transaction payload, matches the ID and sends the data to untimed functional model 510a. The "transactor" (initiator or target) is a model separate from the AT wrapper 515a (or LT wrapper) that communicates with the AT (or LT) wrapper using transactions. In some embodiments, the request and response queues of a transactor are not available to the wrapper, and only the transactions that the transactor sends from its queue are available to the wrapper.

In FIG. 7, times T1 and T3 correspond to the beginning of the request phase for the first and second transactions, respectively. Times T4 and T9 correspond to the beginning and end, respectively, of the response phase for the first transaction. Between times T4 and T9, burst data is read on the CA bus 540. Times T10 and T12 correspond to the beginning and end, respectively, of the response phase for the second transaction.

Various embodiments provide advantages to system designers. Reusing a single functional core (e.g., an untimed functional model that implements the original algorithm of a device) by attaching subsequent timing layers thereto for different applications enables earlier software development than previously possible, e.g., using LT techniques as in FIG. 3 described above. Earlier hardware architecture exploration is enabled using AT techniques as in FIG. 4 described above.

Additionally, improved hardware functional verification at RTL is enabled with various embodiments. As noted above, one of the hurdles that functional verification faces at the RTL stage is the speed of simulation, which may be about 100-200 cycles per second in an optimistic scenario. One way to counter such a slow simulation speed is to leave only a few system blocks at RTL level, while using the untimed ESL model encapsulated with an LT/AT wrapper and communicating with a cycle accurate transactor for the rest of the blocks.

Because the functional core (i.e., the untimed ESL model) is at a high level, it may run in millions of cycles per second. Even though the LT/AT wrapper and the cycle accurate transactor slow down the overall speed of the model, it may still be in many thousands of cycles per second, which is conducive to running millions of validation cycles at RTL level. In some embodiments, the untimed ESL functional core advantageously runs at transaction level with zero (timed) events and with no need to return to the event scheduler. Such an assortment of models at various levels, ultimately derived from a high level untimed functional models thus provides several advantages.

Figure 8:
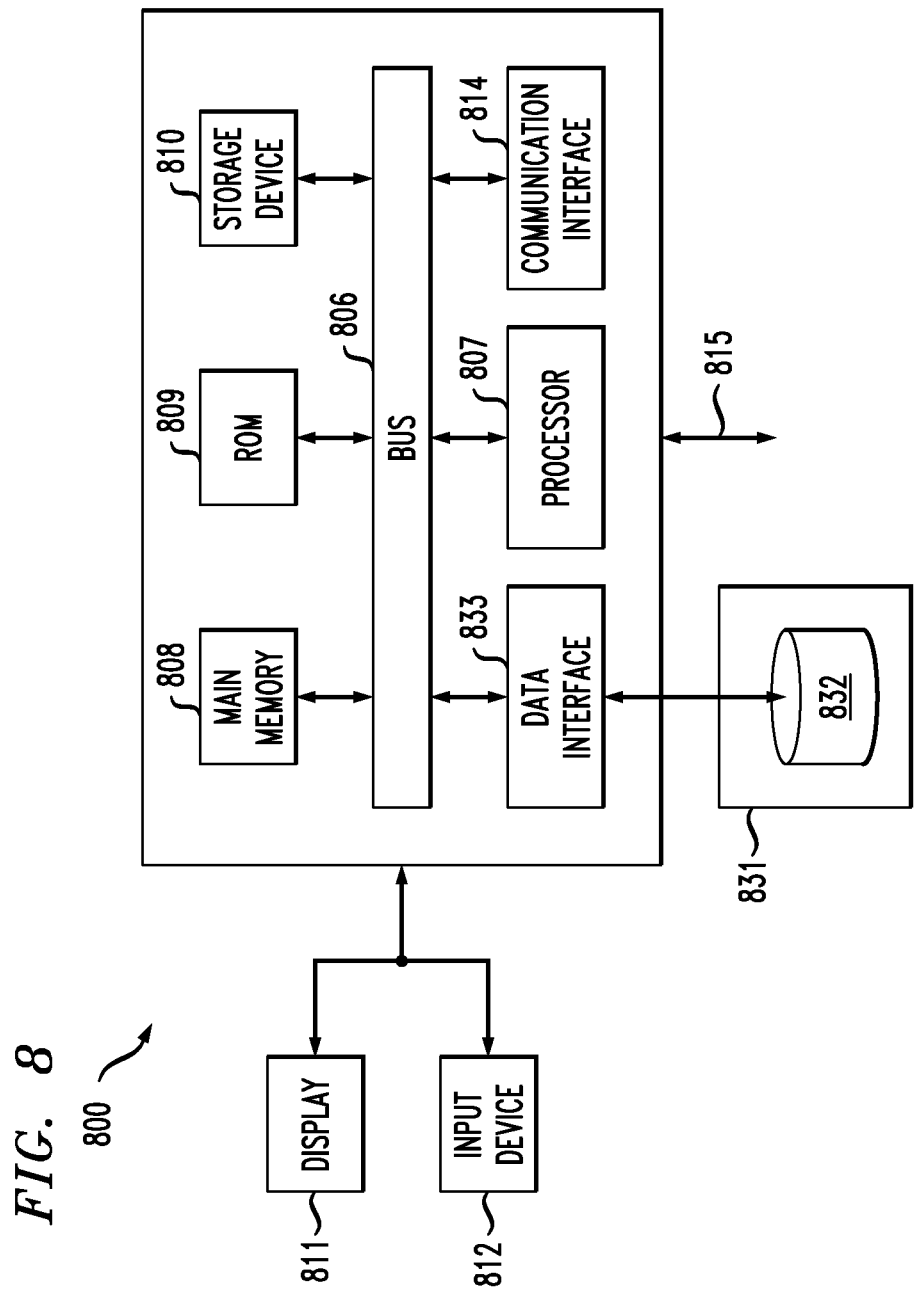
FIG. 8 is a block diagram of functional components of a computer system in accordance with an embodiment.

FIG. 8 is a block diagram of functional components of a computer system 800 in accordance with an embodiment. Computer system 800 may include a communication interface 814 coupled to the bus 806. The communication interface 814 provides two-way communication between multiple computer systems 800. The communication interface 814 of a respective computer system 800 transmits and receives electrical, electromagnetic or optical signals, including data streams representing various types of signal information, e.g., instructions, messages and data. A communication link 815 links one computer system 800 with another computer system 800. For example, the communication link 815 may be a LAN, in which case the communication interface 814 may be a LAN card, or the communication link 815 may be a public switched telephone network (PSTN), in which case the communication interface 814 may be an integrated services digital network (ISDN) card or a modem.

Computer system 800 may transmit and receive messages, data, and instructions, including programs, i.e., application code, through its respective communication link 815 and communication interface 814. Received program code (instructions) may be executed by the respective processor(s) 807 as it is received, and/or stored in the storage device 810, or other associated non-volatile media, for later execution.

In an embodiment, computer system 800 operates in conjunction with a data storage system 831, e.g., a data storage system 831 that contains a database 832 that is readily accessible by the computer system 800. The computer system 800 communicates with the data storage system 831 through a data interface 833. Data interface 833, which is coupled to the bus 806, transmits and receives electrical, electromagnetic or optical signals, that include data streams representing various types of signal information, e.g., instructions, messages and data. In embodiments of the invention, the functions of the data interface 833 may be performed by the communication interface 814.

Computer system 800 includes a bus 806 or other communication mechanism for communicating instructions, messages and data, collectively, information, and one or more processors 807 coupled with the bus 806 for processing information. Computer system 800 also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807.

The computer system 800 may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

Computer system 800 may be coupled via the bus 806 to a display device 811, such as, but not limited to, a display monitor, for displaying information to a user. An input device 812, e.g., alphanumeric and/or other keys, is coupled to the bus 806 for communicating information and command selections to the processor(s) 807.

In an embodiment, an individual computer system 800 performs specific operations by respective processor(s) 807 executing one or more sequences of one or more instructions contained in the main memory 808. Such instructions may be read into the main memory 808 from another computer-readable tangible storage medium, such as the ROM 809 or the storage device 810. Execution of the sequences of instructions contained in the main memory 808 causes the processor(s) 807 to perform the processes described herein. For example, such instructions when executed may cause the processor(s) 807 to perform process 200 in FIG. 2. In alternative embodiments, hard-wired circuitry may be used in place of or in combination with software instructions to implement an embodiment or a component of an embodiment. Thus, embodiments of the invention are not limited to any specific combination of hardware circuitry and/or software.

The term "computer readable storage medium," as used herein, refers to any tangible storage medium that provides information or is usable by the processor(s) 807. Such a medium may take many forms, including, but not limited to, non-volatile, and volatile media. Non-volatile media, i.e., media that can retain information in the absence of power, includes the ROM 809, CD ROM, CD-RW, DVD-ROM, DVD-RAM, DVD-RW, BD-ROM and flash memory, magnetic tape, and magnetic discs, for example. Volatile media, i.e., media that cannot retain information in the absence of power, includes the main memory 808, cache memory or other register storage.

Although examples are illustrated and described herein, embodiments are nevertheless not limited to the details shown, since various modifications and structural changes may be made therein by those of ordinary skill within the scope and range of equivalents of the claims.

What is claimed is:

1. A method comprising:
modeling a system block of a system-on-chip (SoC) in a computer-implemented untimed functional model at an untimed functional level;
generating a computer-implemented transaction level (TL) model of the system block at a transaction level (TL) by reusing the untimed functional model, wherein generating the TL model includes encapsulating the untimed functional model in a wrapper logic module configured to modify an interface between the untimed functional model and an external memory module;
generating a computer-implemented cycle accurate (CA) model of the system block at a cycle accurate (CA) level by directly reusing the TL model, wherein the CA level has cycle accuracy at SoC signal level using signal-level timing granularity of the SoC, and wherein generating the CA model includes encapsulating the TL model in a transactor module configured to communicate with the wrapper logic module and a CA bus; and
verifying functionality of the SoC by operating a processor to execute a software program using at least one of the TL model and the CA model.

2. The method of claim 1, wherein the untimed functional model is implemented in a programming language selected from the group consisting of C, and C++.

3. The method of claim 1, wherein the TL model is a loosely timed (LT) model.

4. The method of claim 1, wherein the TL model is an approximately timed (AT) model.

5. The method of claim 1, wherein generating the TL model includes:
retrieving data from the untimed functional model;
encapsulating the data into a generic payload (GP); and
creating a transaction object from the generic payload at the transaction level.

6. A method of transmitting data, the method comprising:
modeling at least one system block of a system-on-chip (SoC) at an untimed functional level in first and second untimed functional models;
generating first and second transaction level (TL) models of the at least one system block at a transaction level (TL) by reusing the first and second untimed functional models, respectively;
generating first and second cycle accurate (CA) models at a cycle accurate (CA) level by reusing the first and second TL models, respectively;
transmitting data from the first untimed functional model to the first CA model;
transmitting the data from the first CA model to the second CA model via a CA bus, wherein the CA bus is at SoC signal level and at a signal-level timing granularity of the SoC; and
transmitting the data from the second CA model to the second untimed functional model.

7. The method of claim 6, wherein generating the first TL model includes:
retrieving the data from the first untimed functional model;
encapsulating the data in a generic payload (GP); and
creating a transaction object from the generic payload.

8. The method of claim 7, wherein generating the first CA model includes encapsulating the first TL model in a first transactor module configured to communicate with the first TL module and the CA bus.

9. The method of claim 8, wherein transmitting data from the first untimed functional model to the first CA model includes:
sending the transaction object from the first TL module to the first transactor module; and
retrieving a payload comprising the data at the first transactor module.

10. The method of claim 9, wherein transmitting the data via the bus comprises driving the payload onto the CA bus.

11. The method of claim 10, wherein transmitting the data from the second CA model to the second untimed functional model includes:
retrieving the payload at a second transactor module of the second CA model;
sending the payload to the second TL model;
retrieving the data in the payload from a memory using an address specified by the payload; and
storing the data in the second untimed functional model.

12. The method of claim 6, wherein transmitting the data from the first untimed functional model to the first CA model includes transmitting the data from the first untimed functional model to the first TL model and transmitting the data from the first TL model to the first CA model, and wherein transmitting the data from the second CA model to the second untimed functional model includes transmitting the data from the second CA model to the second TL model and transmitting the data from the second TL model to the second untimed functional model.

13. A non-transitory computer readable storage medium having instructions stored thereon, the instructions when executed by a processor causing the processor to perform the operations of:
modeling a system block of a system-on-chip (SoC) in an untimed functional model at an untimed functional level;
generating a transaction level (TL) model of the system block at a transaction level (TL) by reusing the untimed functional model, wherein generating the TL model includes encapsulating the untimed functional model in a wrapper logic module configured to modify an interface between the untimed functional model and an external memory module; and
generating a cycle accurate (CA) model of the system block at a cycle accurate (CA) level by directly reusing the TL model, wherein the CA level has cycle accuracy at SoC signal level using signal-level timing granularity of the SoC, and wherein generating the cycle accurate (CA) model includes encapsulating the TL model in a transactor module configured to communicate with the wrapper logic module and a CA bus.

14. The computer readable storage medium of claim 13, wherein the TL model is a loosely timed (LT) model.

15. The computer readable storage medium of claim 13, wherein the TL model is an approximately timed (AT) model.

16. The computer readable storage medium of claim 15, wherein generating the TL model includes:
retrieving data from the untimed functional model;
encapsulating the data into a generic payload (GP); and
creating a transaction object from the generic payload at the transaction level.

* * * * *